Oct. 29, 1957     C. A. RIETZ     2,811,448
WINE MAKING PROCESS
Filed April 12, 1952
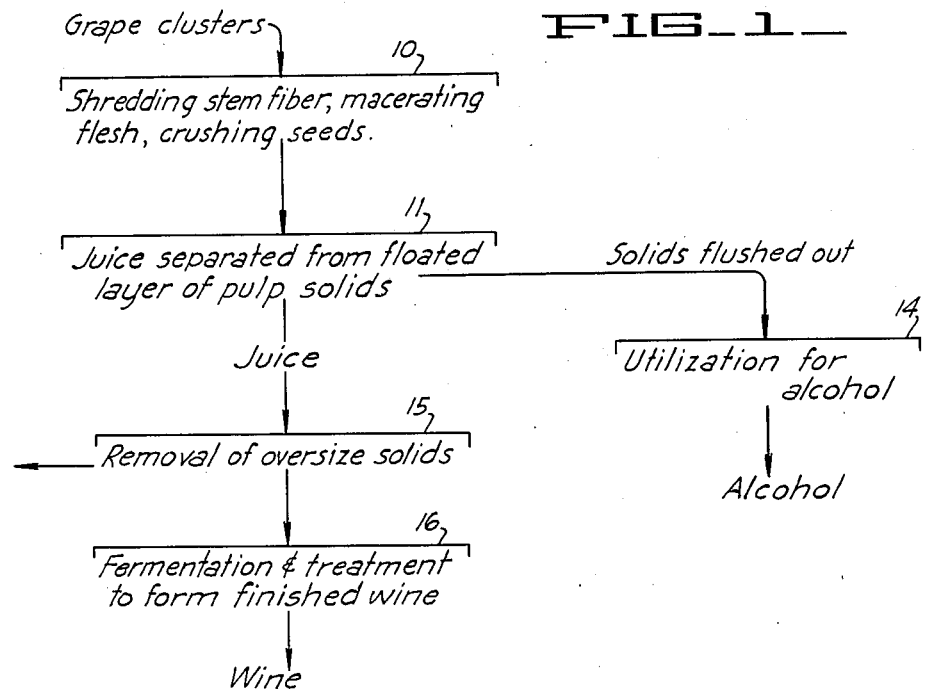
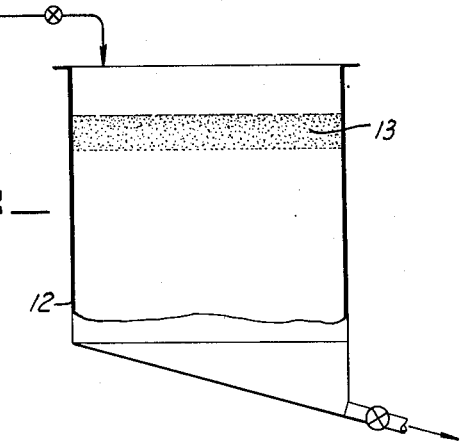
INVENTOR.
Carl A. Rietz
BY
ATTORNEYS 2,811,448
Patented Oct. 29, 1957

2,811,448
WINE MAKING PROCESS

Carl A. Rietz, San Francisco, Calif., assignor to Rietz Manufacturing Co., San Francisco, Calif., a corporation of California Application April 12, 1952, Serial No. 281,971

9 Claims. (Cl. 99—36)

This invention relates generally to processes for the manufacture of wine from grapes.

Conventional processes now in use in the United States for the manufacture of wine from grapes, involves treatment of the grape clusters in a suitable mill which separates out the major part of the stems, and macerates the berries without crushing the seeds. Juice is drained from the resulting material and is then fermented. The remaining pomace may be used for the manufacture of alcohol. A characteristic of such processes is that care is taken to minimize introduction of stem fiber into the macerated mixture which provides the juice. It has been deemed that the presence of any substantial amount of stem fiber tends to introduce detrimental flavor constituents. For the same reason it has been deemed deleterious to crush the seeds of the grapes during the macerating operation.

Instead of removing juice before fermentation some processes have fermented the macerated material and thereafter removed the wine from the pomace. The pomace can then be pressed to remove a lower grade wine.

Considerable equipment is necessary to carry out conventional wine operations, including particularly the stem removing and macerating machines. The plant equipment required for a given capacity is relatively extensive and costly, and an excessive amount of labor is required for a plant operation. One cannot reduce the time periods required for various operations without a sacrifice in quality and/or yield of wine or alcohol.

It is an object of the present invention to provide a new process for the manufacture of wine which will make possible substantial economies with respect to equipment and labor required.

Another object of the invention is to provide a new wine making process making possible a greater yield of wine per ton of grapes, and also a greater yield of by-product alcohol.

Another object of the invention is to provide a new wine making process which facilitates production of a wine of desired characteristics, including color and flavor.

Additional objects and features of the invention will appear from the following description in which the preferred embodiment of the invention has been set forth in detail in conjunction with the accompanying drawing.

Referring to the drawings:

Figure 1 is a flow sheet illustrating one procedure for carrying out the invention.

Figure 2 schematically illustrates equipment for carrying out the primary separating operation.

The present process involves mechanical treatment of grape clusters to form a hydrous pulp-like mixture which contains all of the stem fiber, together with material derived from the skins, seeds and flesh of the grapes. The seeds of the grapes are crushed, rather than left uncrushed as in conventional processes. Solids of this mixture are separated from the juice by a simple procedure, and thereafter the juice is fermented. As an alternative procedure the material is fermented before the wine is separated from the pomace.

The flow sheet of Figure 1 illustrates one suitable way in which the process can be practiced. In operation 10 the grape clusters are subjected to mechanical treatment in order to provide a mixture containing shredded stem fiber, macerated skin and flesh, and crushed seeds. Preferably the mechanical treatment is carried out in two steps, in the first of which there is some mechanical breaking and shredding of the stem fiber, with some crushing of the berries. This step can be carried out by use of a suitable breaker mill having rotating hammers arranged to break up the stem portions of the clusters, with some shredding of the fiber, and with preliminary crushing of the berries. The breaker mill shown in my copending application Serial 281,972, filed April 12, 1952, now Patent No. 2,738,932 of March 20, 1956, can be used with good results. In the second step of operation 10 the fiber is further shredded, the skins are shredded and flaked, the seeds are crushed, and the flesh is thoroughly disintegrated. Preferably the second step is carried out by a suitable hammer mill which serves to disintegrate by high velocity impact. A suitable mill for this purpose is one of the Rietz type, having a vertically disposed high speed rotor, surrounded by a cylindrical discharge screen. The rotor may for example be operated at a relatively high speed of the order of 1740 to 3600 R. P. M. for a rotor 12 inches in diameter. The mill may be constructed as disclosed in my Patent 2,543,599.

In passing through the second mill, stem fiber is disintegrated by shredding, and there is likewise a shredding and flaking of the skins. The seeds are crushed and may be partially disintegrated. The flesh is disintegrated and pulped, to avoid presence of flesh fragments of substantial size. The mill can advantageously be arranged to have two discharges, one of hydrous material passing through the cylindrical screen, and the other of fibrous material from the bottom zone of the rotor. These two materials are merged and intermixed to form a material for further treatment.

In the next stage 11 the juice is separated from undissolved pulp solids. This is carried out by delivering the mixture from the high speed disintegrator to a tank of suitable size, after which a quiescent body of the material is permitted to stand. Immediately upon delivery of the mixture into the tank, undissolved pulp solids start to rise and separate from a lower layer of juice. After a period of time such as from one to two hours, the separated solids tend to form a relatively dense layer floating upon the surface of the juice. Figure 2 illustrates this operation. The tank 12 receives the mixture and the layer or flotsam 13 represents the floating and separated solids.

The juice is now drained from the lower end of the tank, leaving the separated layer of solids. It is desirable to introduce a new batch of material from operation 10, without removing the pulp solids. The second batch of material can be introduced directly upon top of the previously formed separated layer. Thereafter the material can again be permitted to stand for a period of time such as from one to two hours for separation of solids, after which juice is drawn off from the lower end of the tank. This procedure can be repeated several times, or until the layer of pulp solids has reached such dimensions that its discharge from the tank is desirable. The solids can be removed from the tank as by flushing, and this material can be fermented at 14 for the manufacture of alcohol. It contains stem fiber, crushed seeds and seed fragments, skin fragments, and fiber from the flesh of the berries. It also has a substantial amount of fermentable sugar, derived from both the stems and the berries.

The juice recovered from operation 11 can be treated in step 15, as by screening, for the removal of oversize solid fragments. It is then subjected to conventional fermentation 16 and other treatment which may be applied for the manufacture of wine.

In place of screening, step 16 can be carried out by centrifuging, which is advantageous because it removes a substantial part of slime solids present, together with oversize fragments of skin and the like.

It will be evident that the process described above has many advantages over conventional processes. The mechanical mills utilized in carrying out the operation 10 make possible relatively high continuous capacity with a minimum amount of labor. For a desired capacity such machines are relatively inexpensive, and they can be readily serviced and maintained. Instead of two separate mills operated in series, one combination mill can be used, provided it is equipped with means for carrying out the desired shredding and disintegrating operations. Separating operation 11 is likewise carried out by the use of relatively simple equipment. Here again a relatively small amount of labor is required, and the equipment involved is relatively inexpensive. Continuous treatment of material can be made possible in operation 11, by utilizing a number of tanks cycled successively to provide for a continuous discharge of juice.

The separating effect obtained in operation 11 is remarkable in its speed and effectiveness. In part the levitating effect may be due to incorporation or attachment of air or other gas with the solid fragments. Also there may be a coagulating effect by virtue of soluble constituents released by disintegration.

Another advantageous feature of the present process, which cannot be explained adequately, is the fact that it makes possible an increased yield of wine per ton of grapes treated. For example, in one instance it was normal practice to obtain about 135 gallons of finished free run wine per ton of grapes, whereas by use of the present process it was possible to obtain 170 to 190 gallons of wine per ton from the same grapes. The yield of alcohol was likewise greater than obtained by conventional processes. Thus in the same operation referred to above, the alcohol yield obtained by my process was about three gallons more per ton of grapes than with a conventional process. Also it was possible to use a pomace fermentation time of from 24 to 48 hours, in contrast with from 48 to 96 hours for conventional processes. It has been noted that when applying my process as described above, wine made from red grapes has an attractive rose color, which is superior to wine made from the same grapes by conventional processes. Also it appears that when clarification is applied, after fermentation, the clarifying operation takes place more rapidly.

While it is considered that my process can be applied for the manufacture of various types of wines, it has been applied in particular to the manufacture of so-called "Standard Wines."

In the process as outlined in Figure 1 and as described above, the juice is fermented after the separating operation 11. While this procedure is preferable, it is possible to ferment the material from operation 10 and then subject the fermented material to the same type of separating operation as previously described in connection with Figure 2. Fermentation does not appear to affect the separating action. Instead of transferring the material after fermentation to a separate tank or tanks for separation, separation may take place in the fermentation tanks. In fact some agitation during fermentation is desirable in order to avoid accumulation of solids in a dense floating layer. The removed wine is then treated to clarification etc. to produce a marketable product, while the pomace can be treated by distillation to remove alcohol.

Fermentation before separation is desirable when it is desired to develop deeper color, as for example the red color of port wine from red grapes. During such fermentation the presence of stem fiber and crushed seeds does not detrimentally affect the flavor.

Another modification is to partly ferment before separation, and then complete fermentation of the juice after separation. This is desirable in instances where development of some color is desired, as for example a reddish color from red grapes.

While floating the solids is the preferred procedure for the separating operation, it is possible to remove the solids by the use of suitable sieves or screens.

In general it will be apparent that my process makes possible great economies in the wine making industry. The cost per gallon of wine is substantially reduced, and it is simpler to regulate the process for maintenance of desired characteristics. The over-all time required to make the wine is materially reduced, the equipment required is greatly simplified, labor requirements are greatly reduced, and difficulties of operation and maintenance are minimized.

I claim:

1. In a process for the manufacture of wine, subjecting grape clusters to mechanical treatment to effect shredding of the stem, shredding and breaking of the skins, crushing of the seeds, and pulping of the flesh, and then utilizing said mixture for the manufacture of wine, said last step including removal of juice from the shredded stems, skin fragments and crushed seeds.

2. A process as in claim 1 in which fermentation of the juice is carried out after removal of juice.

3. A process as in claim 1 in which fermentation is carried out before removal of juice.

4. A process as in claim 1 in which the solids remaining after said removal are used for the manufacture of alcohol.

5. In a process for the manufacture of wine, first subjecting grape clusters to mechanical treatment to effect shredding of the stems and partial crushing of the grapes, secondly, subjecting the resulting material to impact disintegration to further shred the stems, to crush the seeds, to disintegrate and flake the skins, and to pulp the grape flesh, said impact disintegration resulting in the formation of a hydrous mixture containing shredded stem fiber, and then subjecting the resulting mixture to treatment for the manufacture of wine, said last step including removal of juice from the shredded stems, skin fragments and crushed seeds.

6. In a process for the manufacture of wine from grape clusters, the steps of first subjecting the grape clusters to mechanical treatment to shred the stems and to partially crush the grapes, secondly, subjecting the resulting material to impact disintegration to effect further shredding of the stems, crushing of the seeds, shredding and flaking of the skins, and pulping of the flesh to form a hydrous mixture containing shredded stem fiber and crushed seeds, and then subjecting said mixture to treatment for the manufacture of wine, said last named step including removal of juice from the shredded stems, skin fragments and crushed seeds.

7. A process as in claim 6 in which the solids remaining after removing the juice are used for the manufacture of alcohol.

8. In a process for the manufacture of wine from grape clusters, the steps of first subjecting the grape clusters to preliminary mechanical disintegration in a breaker mill having rotating hammers to effect shredding of the stems and partial crushing of the grapes, secondly, subjecting the shredded stems and partially crushed grapes to impact disintegration in a hammer mill to effect further shredding of the stems, crushing of the seeds, shredding and flaking of the skins, and pulping of the flesh to form a hydrous mixture, said last step being characterized by high velocity impact with the hammers, and then subjecting the resulting mixture to treatment for the manufacture of wine, said last step including removal of juice from the shredded stems, skin fragments and crushed seeds.

9. In a process for the manufacture of wine, subjecting grape clusters to mechanical treatment to effect shredding of the stem, shredding and breaking of the skins, crushing of the seeds and disintegration of the flesh, permitting a substantially quiescent batch of the resulting material to stand to thereby cause undissolved pulp solids to rise and separate from a lower layer of juice, the rising solids forming a relatively dense floating layer, removing separated juice from the mass of material leaving the separated layer of solids, introducing a new batch of material resulting from said mechanical treatment into the remaining part of the first batch, again permitting the material to stand in substantially quiescent condition whereby pulp solids rise and separate from a lower layer of juice, again removing separated juice from the mass of material, and subjecting the juice to further treatment for the manufacture of wine.

References Cited in the file of this patent

UNITED STATES PATENTS

| | | |
|---|---|---|
| 35,915 | Baer | July 22, 1862 |
| 301,629 | Sainsevain | July 8, 1884 |
| 2,417,184 | Wagner et al. | Mar. 11, 1947 |
| 2,536,993 | Cremaschi | Jan. 2, 1951 |
| 2,536,994 | Cremaschi | Jan. 2, 1951 |
| 2,647,058 | Schapiro | July 28, 1953 |

FOREIGN PATENTS

| | | |
|---|---|---|
| 574,857 | Great Britain | Jan. 23, 1946 |